US010936472B2

(12) United States Patent
Walber et al.

(10) Patent No.: US 10,936,472 B2
(45) Date of Patent: Mar. 2, 2021

(54) SCREEN RECORDING PREPARATION METHOD FOR EVALUATING SOFTWARE USABILITY

(71) Applicant: EYEVIDO GMBH, Koblenz (DE)

(72) Inventors: Tina Walber, Koblenz (DE); Christoph Schaefer, Koblenz (DE)

(73) Assignee: EYEVIDO GMBH, Koblenz (DE)

( * ) Notice: Subject to any disclaimer, the term of this patent is extended or adjusted under 35 U.S.C. 154(b) by 0 days.

(21) Appl. No.: 16/429,147

(22) Filed: Jun. 3, 2019

(65) Prior Publication Data
US 2020/0125481 A1 Apr. 23, 2020

(30) Foreign Application Priority Data
Oct. 17, 2018 (EP) ..................................... 18200897

(51) Int. Cl.
*G06F 11/36* (2006.01)
*G06F 3/01* (2006.01)
(52) U.S. Cl.
CPC .......... *G06F 11/3664* (2013.01); *G06F 3/013* (2013.01); *G06F 11/3676* (2013.01); *G06F 11/3692* (2013.01)
(58) Field of Classification Search
CPC .. G06F 11/3692; G06F 11/3664; G06F 3/013; G06F 11/3676
See application file for complete search history.

(56) References Cited

U.S. PATENT DOCUMENTS 9,934,129 B1 * 4/2018 Budurean ........... G06F 11/3688
2007/0104369 A1 * 5/2007 Weatherhead ..... G06Q 30/0242
382/181

(Continued)

FOREIGN PATENT DOCUMENTS

EP 2713290 A1 4/2014
EP 2713290 A2 4/2014
(Continued)

OTHER PUBLICATIONS

European Extended Search Report dated Apr. 23, 2019 for Application No. 18200897.9.

*Primary Examiner* — Lewis A Bullock, Jr.
*Assistant Examiner* — Theodore E Hebert
(74) *Attorney, Agent, or Firm* — Schmeiser, Olsen & Watts, LLP

(57) ABSTRACT

Provided is a screen recording preparation method for evaluating software usability using additional data of a user session carried out by a computing system includes at least the following steps in an initial phase: loading a screen recording including a number of N time-ordered screenshots of the user session from a storage medium and detecting visual features within each of the N screenshots, wherein each of the features is attributed a position within the respective screenshot and a score identifying the feature, and creating a set of metadata containing an identifier of each of the N screenshots and the features detected within each of the N screenshots and setting a threshold similarity value. The method also comprises a cycling phase for treating the metadata. Also, a computing system, a computer program and a computer-readable storage medium perform a method according to an embodiment of the present invention.

13 Claims, 7 Drawing Sheets

(56) References Cited

U.S. PATENT DOCUMENTS

| | | | |
|---|---|---|---|
| 2012/0030711 A1* | 2/2012 | Rae | G06F 16/5866 |
| | | | 725/46 |
| 2013/0182949 A9* | 7/2013 | Pankratius | G06F 16/958 |
| | | | 382/165 |
| 2014/0095979 A1* | 4/2014 | Meckler | G06F 40/14 |
| | | | 715/234 |
| 2014/0189576 A1* | 7/2014 | Carmi | G06K 9/6204 |
| | | | 715/781 |
| 2016/0378642 A1* | 12/2016 | Adams | G06F 3/04842 |
| | | | 717/125 |
| 2018/0067842 A1* | 3/2018 | Kochura | G06F 11/3676 |
| 2018/0097763 A1* | 4/2018 | Garcia | H04L 51/32 |
| 2018/0107460 A1* | 4/2018 | Takata | G06T 13/80 |
| 2018/0112995 A1* | 4/2018 | Bortolussi | G01C 21/3679 |
| 2019/0050323 A1* | 2/2019 | Kogan | G06F 3/013 |
| 2019/0251707 A1* | 8/2019 | Gupta | G06N 3/0454 |

FOREIGN PATENT DOCUMENTS

| | | | |
|---|---|---|---|
| WO | 2007056373 | A2 | 5/2007 |
| WO | WO2007056373 | A2 | 5/2007 |
| WO | 2017123203 | A1 | 7/2017 |
| WO | WO2017123203 | A1 | 7/2017 |

* cited by examiner

SCREEN RECORDING PREPARATION METHOD FOR EVALUATING SOFTWARE USABILITY

CROSS-REFERENCE TO RELATED APPLICATIONS

This application claims priority to EP 18200897.9, having a filing date of Oct. 17, 2018, the entire contents of which are hereby incorporated by reference.

FIELD OF TECHNOLOGY

The following relates to a screen recording preparation method for evaluating software usability using eye tracking carried out by a computing system. Furthermore, the following relates to a computing system comprising a processor and a storage medium configured to perform the method, a computer program comprising instructions to carry out the method and a computer-readable storage medium comprising instructions to carry out the method.

BACKGROUND

Users interact with web pages and other software applications on computer screens by e.g. reading content, clicking on links, scrolling, entering text, or triggering actions on certain elements with the computer mouse. Recording such user sessions, i.e. the content displayed on the computer screen, is important in various contexts, e.g. if user behaviour is to be analysed to identify problems in operating a web page or software application (usability analysis).

The recording takes place by continuously taking screenshots of the displayed web page or software user interface and saving them as suite of images. The videos obtained in this way (screen recordings) have a certain sampling rate, which expresses how often a screenshot was taken (typically 30 frames per second). Screen recording is encoded using common video compressions such as the MPEG-4 codec to remove redundant information and reduce the file size of the videos.

To understand a person's user session and all their interactions, the entire screen recording must be viewed and evaluated frame by frame. This process is very time-consuming and error-prone and therefore inefficient.

The publication US2016378642A1 reveals a procedure for assessing the usability of a graphical user interface to perform a task. During a user session, the visibility and use of several areas of the user interface are recorded and navigation sequences are determined based on their use. Furthermore, the visibility and use of the areas as well as navigation sequences are displayed graphically.

The use of the areas is recorded, for example, by mouse clicks. US2016378642A1 does not describe how the areas are defined. The areas are therefore likely to be determined manually in advance of the procedure. Consequently, the method is not suitable for assessing the usability of software or web pages with dynamically changing user interfaces.

The publication WO2007056373A2 describes a procedure for characterising dynamic regions of digital media data, in particular video data. Dynamic regions with visible features are defined in frames of a media segment and the regions are correlated with external data of an observer of the media segment. The external data may include, for example, the viewer's eye tracking data, mental or emotional activity or user input.

The media segment can be defined as desired within the media data, for example by a start time and an end time. In particular, the media data can be automatically segmented into media segments, for example by identifying the beginning and end of the media section by completely black images or by exceeding a predetermined pixel change rate.

If the media segments correspond to meaningful sections of the media data, subsequent analysis becomes easier, but segmentation by manually defining a start and end time is quite laborious. Searching for black images only works for videos but not for screen recordings of web sessions or user sessions that do not contain any black images. Monitoring a pixel change rate of a video sequence or screen recording requires a high amount of computing power and does not reliably lead to a meaningful segmentation.

The publication EP2713290A2 reveals a method for creating and abridging screencasts when viewing web pages. The procedure includes recording the displayed web pages and page changes by input events as screencasts. Based on the input, relevant sections are extracted from the screencast and merged into a combined web page recording. The inputs can include mouse clicks, hover events, scroll events or keyboard inputs. Only those sections of the screencast that were recorded at the time of certain events are included in the abridged recording.

The publication WO2017123203A1 discloses a method and system for application testing based on an analysis of gaze data and user interface elements. A pair of screenshots may be attributed to the same application screen if the difference between this pair of screenshots is below a threshold. As discussed before, the comparison of entire screenshots requires a high amount of computing power and memory.

Obtaining the additional data might interfere with the operating system and software that is used for viewing the web pages. Furthermore, the format of the additional data depends on the operating system and software making further analysis difficult.

SUMMARY

An aspect relates to a simple and universal screen recording preparation method for evaluating software usability more efficiently and reliably.

According to embodiments of the invention, a screen recording preparation method for evaluating software usability using additional data of a user session, e.g. eye tracking data and/or other user data such as mouse position, touch positions or keyboard input, is carried out by a computing system.

The method comprises an initial phase with the following steps:

a) loading a screen recording comprising a number of N time-ordered screenshots of the user session from a storage medium and b) detecting visual features within each of the N screenshots, wherein each of the features is attributed a position within the respective screenshot and a score identifying the feature, and c) creating a set of metadata containing an identifier of each of the N screenshots and the features detected within each of the N screenshots and d) setting a threshold similarity value and a local similarity threshold value and/or a shift similarity threshold value.

The method comprises a cycling phase treating the metadata with the following steps:

e) comparing a number of n consecutive screenshots from an $x^{th}$ screenshot of the screen recording onwards for similarity using only the metadata, wherein similar screenshots have a similarity value deviation below the threshold similarity value, wherein the similarity value is based on the number of common features that have the same score within all of the n screenshots, for $n \in \{2, 3, 4, \ldots, N-x+1\}$ as long as then screenshots (210) are similar and f) attributing the n similar screenshots to a screenshot cluster and g) saving information defining the screenshot cluster to a storage medium and h) reinitialising the cycling phase, wherein x is replaced by x+n, as long as $x+n \in \{2, 3, 4, \ldots, N-1\}$ The steps a to d and e to h are carried out in the described order and the initial phase is performed before the cycling phase. Steps e to h are repeated cyclically until the all N screenshots of the screen recording are compared for similarity using their features and attributed to screenshot clusters if they are similar.

In a first cycle of the cycling phase, the comparing may start for example from the first screenshot of the screen recording. Alternatively, the comparing may start from the last screenshot of the screen recording, whereas n screenshots from the $x^{th}$ screenshot towards the beginning of the screen recording are compared for similarity, and in the step of reinitialising the cycling phase x is replaced by x−n instead of x+n.

An important point of embodiments of the invention is the separation of the method into an initial phase and a cycling phase. In the initial phase, features are detected once in each of the N screenshots and the features and scores of all screenshots are stored in a set of metadata. Typically, this set of metadata is much smaller than the original screen recording.

In the cycling phase, only the metadata are used to compare the screenshots for similarity. Therefore, the comparing requires much less computing power and memory usage with respect to a conventional method comparing the entire original screenshots from the screen recording.

On the one hand, the metadata of each screenshot are treated several times to compare the screenshot with several other screenshots in the cycling phase. On the other hand, each screenshot is treated only once to detect its features in the initial phase. Therefore, the additional computing power necessary to perform the initial phase with respect to a conventional method is largely overcompensated by the savings in computing power obtained by performing the cycling phase on the metadata instead of the original screenshots. In particular, the present method may allow for real-time preparation of the screen recording.

A further advantage of the separation of the method into the initial phase and the cycling phase is that the two phases can be performed at independent times and/or places. For example, the initial phase may be performed by a first computer, e.g. the computer that recorded the screen recording. After that, the small set of metadata may be sent easily to a distant second computer for the cycling phase. This way, the first computer is quickly available again for new tasks, e.g. for recording of another screen recording.

Further analysis may be done on the metadata, too, without necessarily loading the whole screen recording. This way, the screen recording may be stored, for example, on one central server, while analysis may be done on the metadata on one or more clients that load the original screen recording or selected screenshots from the screen recording from the server only if necessary.

Since the cycling phase is not very demanding in terms of computing power and memory usage, it may be repeated several times with differently set threshold similarity values to obtain a reasonable number of clusters. This way, the threshold similarity value may be adapted automatically to the content of the screen recording.

The method takes as input a screen recording from a user session. This is a video sequence of the viewed monitor content of a user, recorded with a specific sampling rate (e.g. 30 screenshots per second). The screencast is encoded with a common video compression such as the MPEG-4 codec in MP4 file format to remove redundant information and reduce the file size of the video.

The screen recording is loaded from a storage medium. According to embodiments of the invention, the term "loading" includes streaming of the screen recording from the memory of the computer recording the screen recording.

By defining screenshot clusters, information from the screen recording is extracted and reorganized in such a way that the user behaviour is stored in an aggregated form and can thus be displayed, traced and evaluated more efficiently.

To analyse the behaviour of a user within a user session, it is important to know whether a new web page or a new window of a software application (with new visual content) was opened. These changes can be identified by comparing the features found for consecutive screenshots. Consecutive frames that show the same content are clustered. The individual screenshots of the screenshot cluster may show different parts of the same web page or application window caused by scrolling or zooming.

The similarity value may be calculated as the ratio of the number of common features, that are identified in all n screenshots, divided by the total number of features identified in the screenshots. The similarity value may include the number of common features, the number of new features, the number of fixed features, the number of newly appearing features and/or the number of disappeared features when comparing a sequence of n screenshots, wherein each of the numbers may be weighed heuristically depending on the content of the screen recording. The similarity value may be normalised by the total number of features identified in the n screenshots or by the average number of features identified in one of the screenshots or in a number of previous screenshots, e.g. in the last ten screenshots. A "common feature" is a feature that is identified in all screenshots by having the same score and may have a different position within each of the screenshots.

Depending on the density of the visual content, a similarity value above a predefined threshold similarity value, e.g. 5% to 30%, 10% to 20%, and about 15%, for a similarity value defined as ratio of number of common features divided by number of total features, indicates that the screenshots belong to the same web page or application window. A threshold similarity value below 100% is preferred, since content changes without page changes occur. It is for example possible, that the user stays on the same page, but user interaction or automatically triggered actions (e.g. a mouse hover over a button or a regularly changing image) lead to small content changes at feature level. Additionally, scrolling within a web page or application window leads to the disappearance of found features and emergence of new features.

Also, page changes without 100% content change are possible. For example, when very similar content, described by the same features, occurs in two different web pages or application windows. Therefore, the threshold similarity value should be above 0%.

The information defining the screenshot cluster may include for example its start time, end time and/or duration or simply ordinal numbers denoting its first and last screenshot within the screen recording.

Once the screen recording and the definitions of the screenshot clusters are available, the screen recording can be analysed much more efficiently because instead of many screenshots only a reduced number of clusters, each representing a meaningful section of the screen recording, e.g. a single web page or application window, must be analysed. Furthermore, the test person's user session can be visualised very easily. For evaluation it is not necessary to watch the entire screen recording and to create visualizations from it, but it is sufficient to view a reduced number of clusters.

Furthermore, the method is based on a screen recording only and does not depend on additional data of the user session, e.g. user interactions, to prepare the screen recording for analysis. Therefore, the method can be easily and universally applied to obtain reliable and comparable data irrespective of the hardware and software environment the user is using during the user session.

Additionally, the method requires only a minimum of resources of the user's computer since only the screen content and not additional data have to be recorded. Using only the screen recording also avoids the additional and possibly error-prone step of synchronising additional data with the screen recording leading to a very efficient and reliable method.

As it is based on visual data from the screen recording itself, the method is particularly suitable for usability analysis of software applications, because in general the source code of the software applications is not readily available and even if it is, one cannot determine easily the visual properties of an object of the application's graphical user interface, e.g. its position on the screen or whether the object is fixed or scrollable. This contrasts with usability analysis of web pages, wherein visual properties of objects of the web page can be derived easily from the HTML-code.

The method may be used for example to analyse the usability of smartphone applications that may be run in a smartphone emulator e.g. on a tablet computer. The method is most easily implemented for user sessions where only one-dimensional scrolling (i.e. either horizontal or vertical) occurs, as it is the case for many smartphone applications.

Additionally, clustering based on visual features is more reliable than clustering based on the complete content of the screenshots, because only features characteristic of the screenshots are used, and it needs less computational power.

According to embodiments of the invention, a visual feature is detected by methods of feature detection know from computer vision that are robust against video compression artefacts, colour changes, scale caused by zooming and spatial one- or two-dimensional shift caused by scrolling.

Visual features are calculated for each screenshot of the screen recording. In this way, local visual characteristics in the screenshot are identified and described. The detected features are described for example by an x-y-coordinate and a numeric score. The score is invariant to coordinate transformations such as translation and rotation. Consequently, a feature can be identified by its score in different screenshots irrespective of coordinate transformations, e.g. due to scrolling or to rotation of the screen.

For the detection of visual features, algorithms may be used that are robust against a compression (e.g. MPEG-4 video compression) of the individual screenshots. Optionally, the step of detecting of the visual features comprises a method of corner detection. A suitable algorithm with a good trade off of computing time and accuracy is the corner detector FAST (Features from accelerated segment test). The score obtained by FAST is a whole number from 0 to 255 proportional to the grayscale-contrast around a pixel.

FAST offers a very high speed of feature detection allowing for real-time feature detection. On the other hand, FAST is relatively sensible to video compression artefacts. Therefore, a well-deblocking video-decoder should be used to avoid instabilities at block borders. Furthermore, the grayscale-values of a screenshot may be binned to reduce the influence of compression artefacts at block borders or high contrast edges in a screenshot. For example, grayscale values from 0 to 255 may be binned into 25 bins, wherein a first bin comprises values from 0 to 9, a second bin values from 10 to 19 and so on. This way slight differences in grayscale value caused by compression artefacts are likely to be compensated by including slightly different grayscale values into the same bin.

If calculation speed is not an issue, more robust feature detection algorithms like SIFT (scale-invariant feature transform) or SURF (speeded up robust features) may be used. Alternatively, a neural network may be trained to detect features.

The method may comprise the following steps performed on the n screenshots of a screenshot cluster:
a) classifying each of the common features of the n screenshots either as a fixed feature if it has the same position in the n screenshots or as a scrolled feature if it has different positions in the n screenshots If fixed features and scrolled features are found during the step of classifying (124), the method may further comprise the following steps performed on the n screenshots of a screenshot cluster, in the given order:
b) identifying regions of the n screenshots containing no scrolled features as fixed regions;
c) cutting the fixed regions from the n screenshots and storing the fixed regions;
d) determining sequentially for $y \in \{1, 2, 3, \ldots, n-1\}$ a $y^{th}$ shift vector between the $y^{th}$ screenshot and the $(y+1)^{th}$ screenshot based on a difference in position of the scrolled features between the two screenshots; and
e) stitching the $2^{nd}$ screenshot to the $1^{st}$ screenshot to obtain an extended screenshot using the $1^{st}$ shift vector to determine the relative position of the two screenshots and
e) stitching sequentially for $y \in \{2, 3, \ldots, n-1\}$ the $(y+1)^{th}$ screenshot to the extended screenshot using the sum of the $1^{st}$ to $y^{th}$ shift vectors to determine the relative position of the $(y+1)^{th}$ screenshot with respect to the extended screenshot.

The fixed regions may be overlaid to the extended screenshot, at their original position in then screenshots or at a final position calculated using the sum of the $1^{st}$ to $(n1)^{th}$ shift vectors. If a fixed region is e.g. a header menu and a user scrolled down during the screen recording, this fixed region should be overlaid at its original position at the top of the extended screenshot. If a fixed region is e.g. a footer menu and a user scrolled down during the screen recording, this fixed region should be overlaid at its final position at the bottom of the extended screenshot.

Position information of additional data positioned in a fixed region of the n screenshots is updated according to the position of the fixed region obtained when overlaying it to the extended screenshot. If the fixed region is overlaid e.g. at the final position, the position information may be updated using the sum of the $1^{st}$ to $(n1)^{th}$ shift vectors. This way, the additional data can be easily visualised and analysed in relationship with the fixed element.

The contents of web pages or application windows can be moved within the viewport of a computer screen e.g. by using the scrollbar to scroll the displayed content upwards or downwards and make new content visible.

Web pages and software applications often contain elements that are displayed independently of the viewport, i.e. they are always displayed in the same place within the computer screen. They do not change their position when scrolling occurs. Examples are menu bars that are fixed at the top or contact forms that are always displayed at the same position.

In one embodiment of the method, the fixed elements are identified as fixed regions by comparing the features of each screenshot with the features of previous screenshots of the screen recording. Features that have not changed their position or score within multiple frames while other features have changed (e.g. because of scrolling) are assumed to be fixed in the viewport.

The extended screenshot may be saved with the information identifying the screenshot cluster.

The $y^{th}$ shift vector may be the mean difference vector between the positions of the common features in the $(y+1)^{th}$ screenshot and the $y^{th}$ screenshot. For stitching the $(y+1)^{th}$ screenshot to the $y^{th}$ screenshot, the $(y+1)^{th}$ screenshot may be shifted by the shift vector with respect to the $y^{th}$ screenshot.

When a user scrolls down, the viewed content is moved up in the screen recording and new content appears at the bottom of the screen recording. A large part of the contents displayed usually remains identical and the individual screenshots can be combined to form an extended screenshot. How far scrolling took place, i.e. how far previously displayed content is pushed upwards or downwards, may be determined with the help of the feature points. For example, all feature points of two consecutive frames are compared and the scroll height is determined by the difference in the positions of the points. Using the detected scroll height, the moved areas in the individual frames may be combined to form one extended screenshot.

Extended screenshots can be analysed more efficiently than the original screenshots because redundant information is removed. In particular, a human examiner may extract relevant information faster from an extended screenshot than from a sequence of partially overlapping screenshots.

If the fixed regions were not cut from the screenshots before stitching they would appear repeatedly in the extended screenshot leading to a falsified representation of the recorded web site or application window making further analysis difficult and error-prone. Therefore, it is important to identify and remove fixed regions. If in doing so parts of scrollable regions are also cut this is usually not a problem in practice, because with typical sampling rates there are large overlaps of the scrollable regions in consecutive screenshots compensating for partial removal of the scrollable regions.

The step of identifying fixed regions may comprise identifying the fixed regions as the regions of then screenshots outside a convex contour of the positions of the scrolled features. Typically, the scrolled features are in the centre of the screenshot and the fixed regions are located at the borders of the screenshot. The shape and position of the fixed regions may be corrected based on known features of the web site or software application that is analysed. For example, if one expects only rectangular header and footer menus at the top and the bottom of the screenshots, one may restrict the fixed regions to these parameters.

The method may comprise defining fixed features located at a given distance from a border of a screenshot as outliers if there are more scrolled features than fixed features at this distance from the border, wherein outliers are not considered for the step of identifying fixed regions. By disregarding outliers, the method is more stable against artefacts, e.g. due to video compression.

Outliers may be found e.g. using a sliding window approach: A window extending over the width of a screenshot and a few, e.g. ten, pixels high is moved vertically over the screenshot. If the window contains more scrollable than fixed features, the latter are defined as outliers. This approach is particularly efficient if the recorded content comprises only rectangular header and/or footer menus extending over the width of the screenshot as fixed elements. Of course, this approach can be easily "rotated" by 90 degrees with respect to the screenshot if side bars extending along the right and/or left border of the screenshot shall be detected as fixed regions.

When an extended screenshot is prepared, the method may comprise the step of updating a position information of additional data attributed to the $(y+1)^{th}$ screenshot using the sum of the $1^{st}$ to $y^{th}$ shift vector. For example, the sum may simply be added to or subtracted from the position information.

To obtain a meaningful assignment, a position information of additional data recorded in the coordinate system of the monitor corresponding to a single screenshot must be modified when the assigned screenshot is combined to an extended screenshot. E.g. the scroll height must be added to or subtracted from the y-coordinate when vertical scrolling occurs, or the scroll width must be added to or subtracted from the x-coordinate when horizontal scrolling occurs.

If there are no scrolled features found within the n screenshots of the screenshot cluster during the step of classifying, the method may comprise the step of defining the first of the n screenshots as extended screenshot of the screenshot cluster. This way, each screenshot cluster of the screen recording is represented by one extended screenshot no matter if scrolling occurred within the screenshot cluster or not.

Automatic or human analysis of the screen recording becomes much more efficient by concentrating on the extended screenshots, each of them representing a screenshot cluster (belonging e.g. each to one web page or application window). Furthermore, considerably less storage space, memory space and transmission bandwidth is required for the extended screenshots compared to the original screen recording. This compression of the data makes the further data processing steps more efficient and faster.

The method may comprise the following steps, in the given order:
a) creating an identification vector of each of the screenshot clusters of a plurality of screenshot clusters based on the scores and also the positions of the features of the screenshot cluster and
b) including the identification vector into a, index-searchable, database.

The conversion of raw screen recordings into a feature-based vector space using identification vectors opens up all the technical possibilities that have been tried and tested in the field of information retrieval for years. The evaluation of user data can be carried out much faster and more precisely than with the evaluation of the screen recording itself.

By incorporating the identification vectors into a database, for example on a non-volatile storage medium, the identification vectors may be removed from the memory of the computer implementing the method. This way, memory space is freed for other tasks. Additionally, further analysis of the identification vectors can be done independently in place and time of the preparation of the screen recording liberating hardware resources of the computer implementing the method, e.g. for a faster preparation of the screen recording, in particular in real time.

If the identification vectors are included in an index-searchable database, they can be analysed very efficiently with established index search and comparison algorithms. In particular, the analysis of identification vectors from a huge number of screen recordings becomes possible, e.g. for statistically valid usability analysis based on user sessions of a huge number of users.

The identification vector may comprise the frequency of the scores and also of the positions of the features of the screenshot cluster using the term frequency inverse document frequency (TF-IDF) concept of information retrieval. An exemplary case of 2000 detected features per extended screenshot and a typical number of 100 extended screenshots per user session and 10 user sessions to be analysed would lead to a total number of 1000 extended screenshots (i.e. 1000 "documents" in the usual terminology of TF-IDF) and $2000 \times 100 \times 10 = 2 \cdot 10^6$ features (i.e. $2 \times 10^6$ "words" in the usual terminology of TF-IDF). In most cases, there are many similar or even identical features and extended screenshots leading typically to some thousands of different features and some tens of different extended screenshots. Such a number of screenshots and features is very suitable for common algorithms of information retrieval, e.g. Apache Lucene or Elasticsearch.

One advantage of TF-IDF is that the obtained identification vector is normalised with respect to the length of a document, i.e. with respect to the number of features of a screenshot cluster. Therefore, it is not necessary to bring extended screenshots of different screenshots to a common size before creating the identification vectors.

To obtain reliable results of information retrieval, the features used to create the identification vectors are free of artefacts. This can be obtained, e.g. by using a robust feature detection algorithm and/or by disregarding outliers as described above and/or by using only features that are common to at least two screenshots and/or by using only features having a score above a predefined value.

The method may comprise the step of comparing the identification vectors of screenshot clusters from a single screen recording and/or from a plurality of screen recordings to aggregate similar screenshot clusters having similar identification vectors.

The similarity of the identification vectors may be measured for example by cosine similarity measurement. Similar vectors include a small angle, i.e. a large cosine of this angle and correspondingly a large cosine similarity value.

The clustering of screenshots results in a sequence of clusters, each of them containing at least one simple or extended screenshot. These clusters may be "named" with a unique identification vector. The identification vector may consist of or include the detected visual features in the (extended) screenshot. Visually identical screenshots contain the same features and have the same identification vector. Therefore, they can be identified as duplicates. Identification vectors of visually similar screenshots, e.g. with partial overlap or equal subareas are also similar and can be compared with known mathematical similarity measures (e.g. cosine similarity). This way, all screenshot clusters are searchable and comparable with the same concepts as implemented in classical information retrieval systems.

Using the identification vectors, different screenshots may be compared, and similar screenshots may be recognized. This can be done within a person's user session (e.g. when the same web page or application window is revisited), but it is also possible to compare the screen recordings of several test persons. For example, it is very easy to calculate how many different web pages or application windows a user has visited and how long he has stayed on each page. Furthermore, user data may be aggregated when several tests persons visit the same web pages or application windows. Thus, the data can be numerically evaluated in a few clicks, for example when it is analysed how many persons clicked or viewed one specific area of a web page or application window.

Many software applications and web pages adapt their layout to the screen width. Therefore, it is useful to set a fixed width, e.g. a fixed number of pixels, of the screen for all user sessions for comparing data from different user sessions without artefacts due to changes in the application or web page layout.

The method may include the following steps, in the given order:

a) loading of additional data of the user session, gaze data and/or interaction data, comprising a timing information correlated to the screen recording from a storage medium and b) attributing the additional data to a screenshot cluster, to a screenshot or extended screenshot of the screenshot cluster, based on the timing information.

The method is particularly suitable for using gaze data as additional data. Gaze data may also be recorded independently of the hardware and software environment of the user session, e.g. with an external eye tracking device. Furthermore, a simple time-stamp of the gaze data allows for easy and reliable attribution of the gaze data to the screen recording. Therefore, gaze data can be easily incorporated into the method to obtain reliable and comparable data universally from different user sessions.

Instead of an external eye tracking device, an eye tracking software using a built-in camera of the computer, e.g. tablet computer or smartphone, running the user session, may also be used to obtain gaze data. This approach has the advantage that no specific hardware is required. An external eye tracking device has the advantages of being universally applicable, requiring less or even no hardware resources of the computer running the user session and delivering in general more precise gaze data.

The method includes the step of overlaying a screenshot or an extended screenshot with additional data attributed to the screenshot or extended screenshot or to the screenshot cluster comprising the screenshot or extended screenshot. Fixed regions are also overlaid to a corresponding screenshot. In particular, gaze data, e.g. fixated points and saccades, from one or more user sessions may be overlaid very conveniently and, in a way, easy to analyse using established methods from eye tracking analysis.

The step of overlaying and displaying the resulting image may be implemented as a web-based application. This way, the resulting image can be displayed at any time and universally on any computer connected to the internet, e.g. for further analysis.

Additional data on user interaction may be taken as input, such as mouse positions at a specific timestamp, clicks with the mouse or touches with position and timestamps or eye tracking data (fixated point with x-y-coordinates at a specific timestamp). Each user input data set can be assigned to one screenshot of the screen recording, e.g. by means of the timestamp. The additional user input data may be saved aside the screen recording, e.g. in a plain text format such as JSON.

On the screenshots, the data of several persons, interacting with the same content, may be visualized. Thus, it is for example easy to create a heat map visualization from gaze data or to obtain an overview, where all users clicked on a web page or application window. The additional data can also be visualized as a click map, i.e. as a representation of a sequence of screenshots with page changes in between, to visualize the test users' interaction with a given web page or application window.

Additional user data can be recorded and added to the method. For example, emotions extracted from facial expressions or arousal information from brain-computer interfaces can easily be added. With increasing data volume, the importance of efficient evaluation options increases and makes the data representation obtained by the method even more valuable.

The setting of the threshold value of the similarity value may be done automatically based on the content of the screen recording. For example, the threshold similarity value may depend on the average number of features detected per screenshot of the entire screen recording and/or on the number of features detected in the screenshots currently compared and/or on the number of features detected in a number of, e.g. ten, previously compared screenshots.

According to embodiments of the invention, a computing system comprises a processor and a storage medium configured to perform a method according to embodiments of the invention.

According to embodiments of the invention, a computer program comprises instructions which, when the program is executed by a computing system, cause the computing system to carry out a method according to embodiments of the invention.

According to embodiments of the invention, a computer-readable storage medium comprises instructions which, when executed by a computing system, cause the computing system to carry a method according to embodiments of the invention.

BRIEF DESCRIPTION

Some of the embodiments will be described in detail, with reference to the following figures, wherein like designations denote like members, wherein.

DETAILED DESCRIPTION

Figure 1:
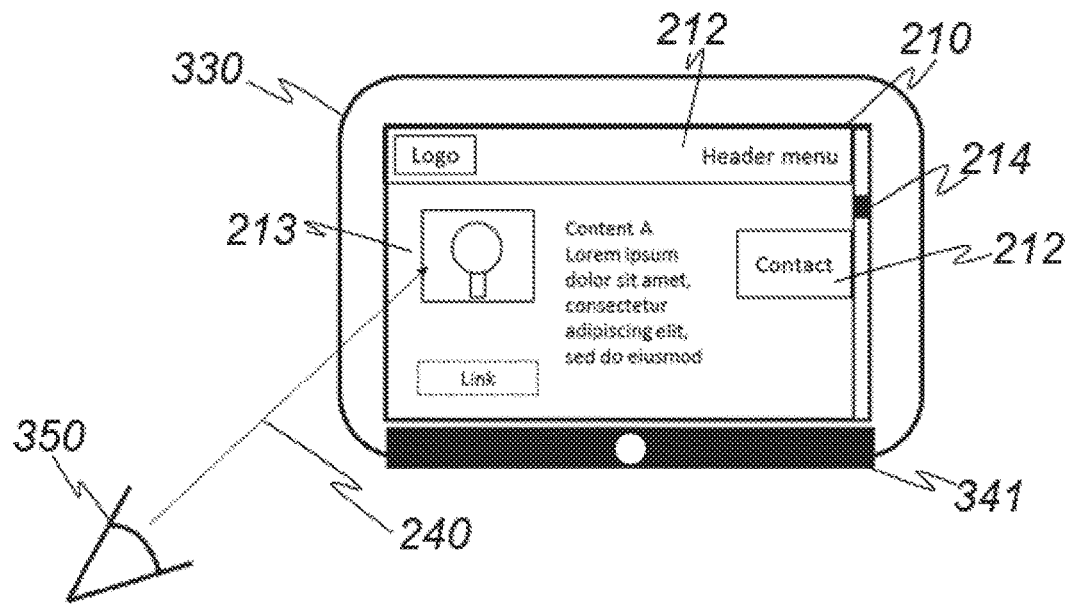
FIG. 1 shows an exemplary set up that may be used to record a screen recording and additional data of a user session.

FIG. 1 shows an exemplary set up that may be used to record a screen recording and additional data of a user session. The set up comprises a display device 330 showing a screenshot 210, e.g. of a web page or a software application a user 350 is using. The screenshot 210 comprises scrollable content 213 that may be moved by the user 350, for example using a scrollbar 214. The screenshot 210 further comprises fixed regions 212, for example a menu bar and/or a contact area. Additional data 240 may be recorded, for example using an eye tracking device 341 to record the user's 350 gaze data.

Figure 2:
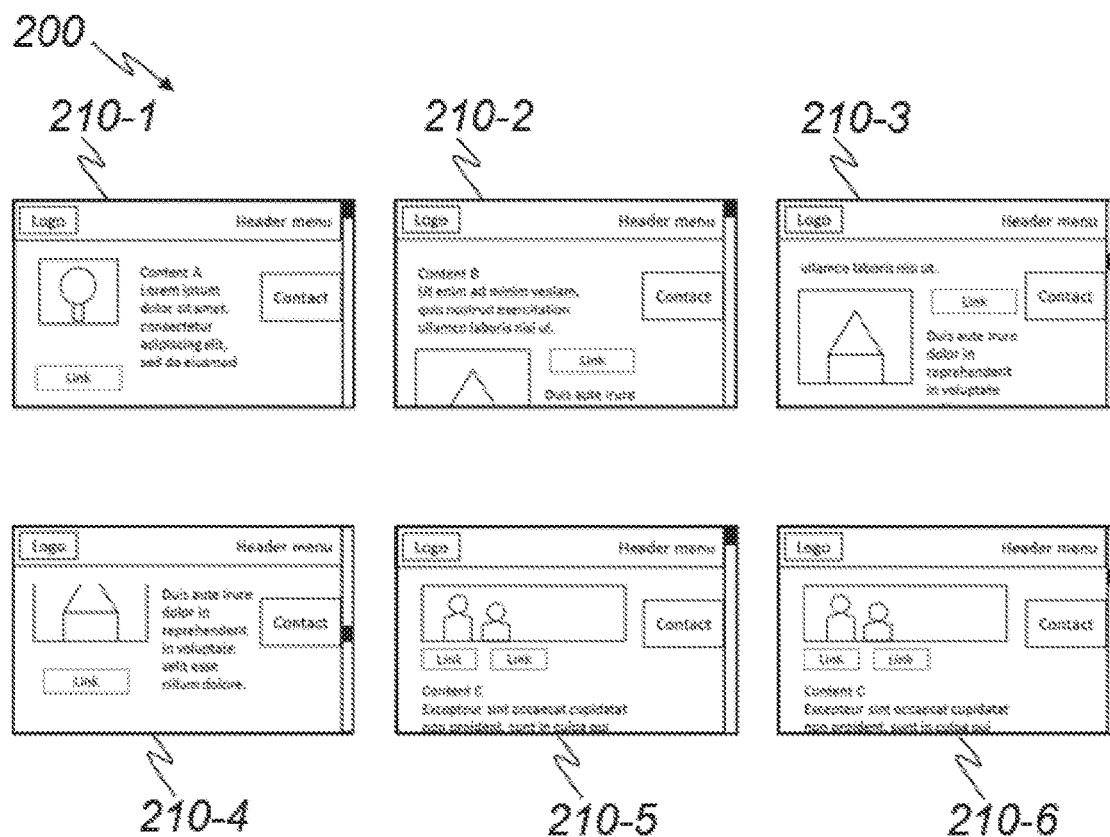
FIG. 2 shows a schematic sequence of screenshots from a screencast.

FIG. 2 shows a schematic sequence of e.g. six screenshots 210-1 to 210-6 from a screen recording 200.

Figure 3:
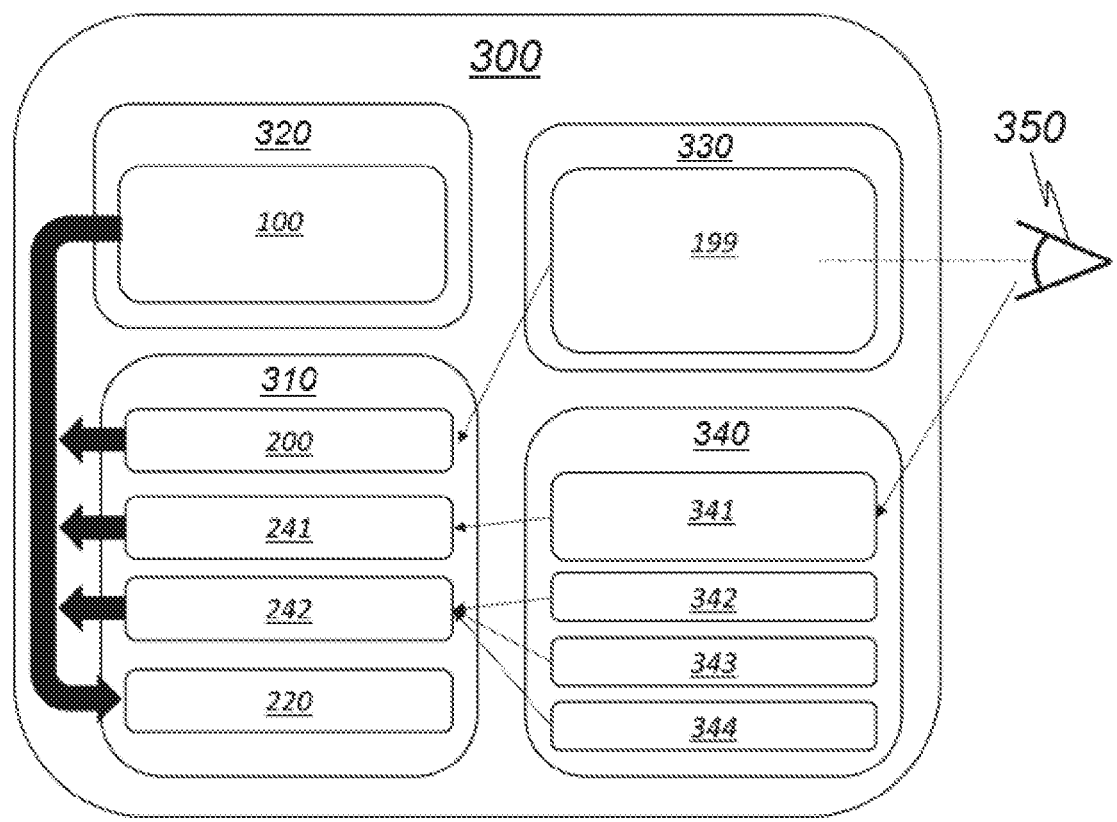
FIG. 3 shows a schematic view of an embodiment of the computing system according to embodiments of the invention.

FIG. 3 shows a schematic view of an embodiment of the computing system 300 according to embodiments of the invention. The computing system 300 comprises a display device 330 showing visual content 199 to a user 350. The visual content 199 may be recorded as a screen recording 200 and stored on a storage medium 310. The computing system 300 comprises a number of user input devices 340, for example an eye tracking device 341, a mouse 342, a touch device 343 and/or a keyboard 344, to record additional data 240, in particular gaze data 241 and/or interaction data 242, to the storage medium 310.

The computing system 300 comprises a processor 320 configured to perform an embodiment of the method 100 according to embodiments of the invention. The processor 320 may use the screen recording 200 and the gaze data 241 and/or interaction data 242 as input and produce at least a definition of a screenshot cluster 220 within the screen recording 200 as output that may be saved to the storage medium 310.

Figure 4:
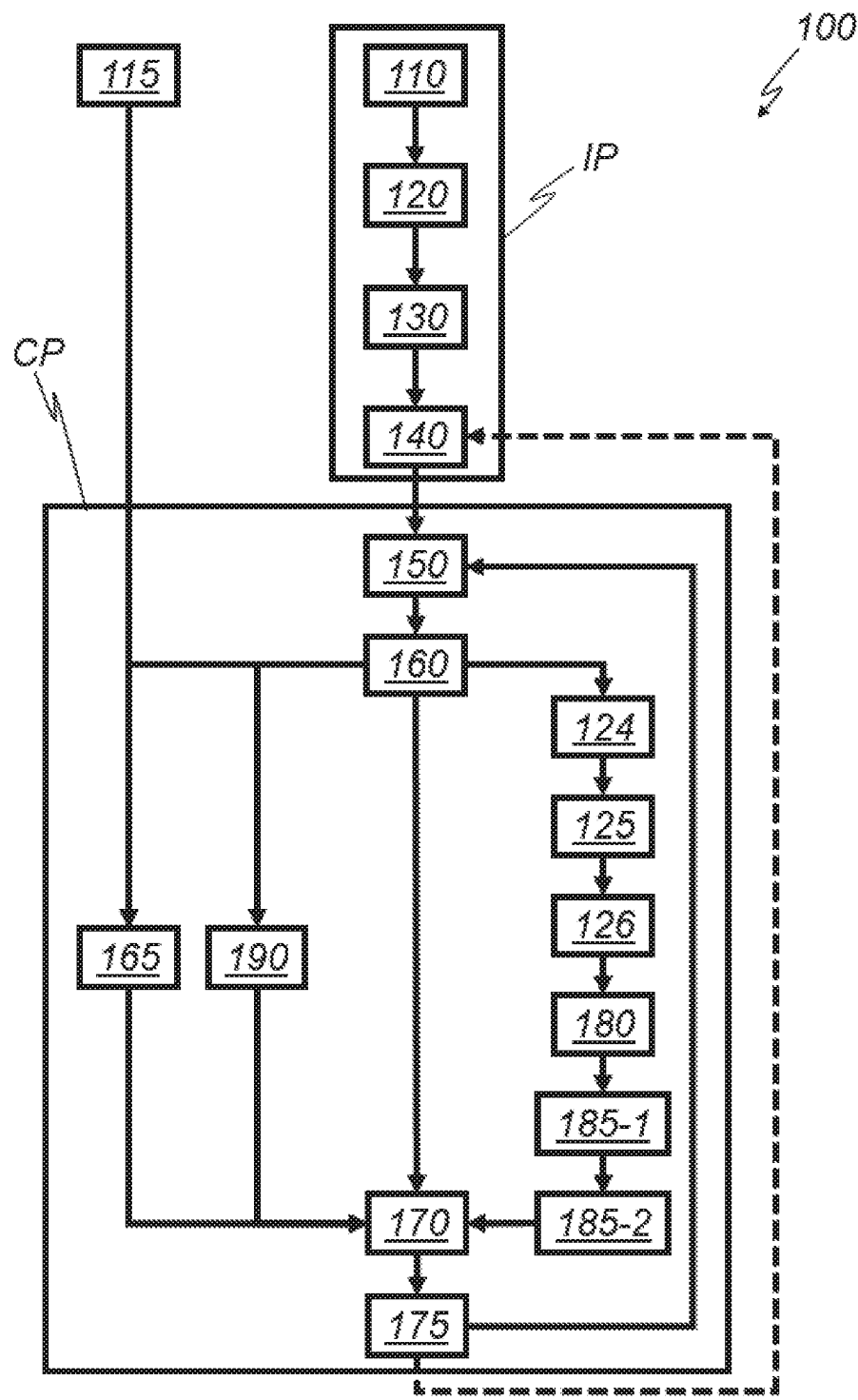
FIG. 4 shows a schematic representation of an embodiment of the method according to embodiments of the invention.

FIG. 4 shows a schematic representation of an embodiment of the method 100 according to embodiments of the invention. The method 100 comprises an initial phase IP with the following steps:

a) loading 110 a screen recording comprising a number of N time-ordered screenshots of a user session from a storage medium and b) detecting 120 visual features within each of the N screenshots, wherein each of the features is attributed a position within the respective screenshot and a score, and c) creating 130 a set of metadata containing an identifier of each of the N screenshots and the features detected within each of the N screenshots and d) setting 140 a threshold similarity value.

The method 100 comprises a cycling phase CP treating the metadata with the following steps:

e) comparing 150 a number of n consecutive screenshots from an $x^{th}$ screenshot of the screen recording onwards for similarity, wherein similar screenshots have a similarity value deviation below the threshold similarity value, wherein the similarity value is based on the number of common features that have the same score within all of then screenshots, for $n \in \{2, 3, 4, \ldots, N-x+1\}$ as long as the n screenshots are similar and f) attributing 160 the n similar screenshots to a screenshot cluster and g) saving 170 information defining the screenshot cluster to a storage medium 310 and h) reinitialising 175 the cycling phase, wherein x is replaced by x+n, as long as x+n∈{2, 3, 4, . . . , N−1}.

The method 100 may comprise the following steps after the step of defining 160 the screenshot cluster performed on the n screenshots of a screenshot:
a) classifying (124) each of the common features of then screenshots (210) either as a fixed feature if it has the same position in then screenshots (210) or as a scrolled feature if it has different positions in the n screenshots (210).
If fixed features and scrolled features are found during the step of classifying (124) the method 100 may comprise the further steps of:
b) identifying (125) regions of the n screenshots (210) containing no scrolled features as fixed regions;
c) cutting (126) the fixed regions from the n screenshots (210) and storing the fixed regions;
d) determining (180) sequentially for y∈{1, 2, 3, . . . , n−1} a $y^{th}$ shift vector between the $y^{th}$ screenshot (210) and the $(y+1)^{th}$ screenshot based on a difference in position of the scrolled features between the two screenshots (210); and
e) stitching (185-1) the $2^{nd}$ screenshot (210) to the $1^{st}$ screenshot (210) to obtain an extended screenshot (250) using the $1^{st}$ shift vector to determine the relative position of the two screenshots (210) and
f) stitching (185-2) sequentially for y∈{2, 3, . . . , n−1} the $(y+1)^{th}$ screenshot (210) to the extended screenshot (250) using the sum of the $1^{st}$ to $y^{th}$ shift vectors to determine the relative position of the $(y+1)^{th}$ screenshot (210) with respect to the extended screenshot (250).

The extended screenshot may be saved 170 with the information identifying the screenshot cluster.

The method 100 may comprise the following step after the step of defining 160 the screenshot cluster:
a) creating 190 an identification vector of each of the screenshot clusters of a plurality of screenshot clusters comprising the positions and scores of the features of the screenshot cluster.

The identification vector may be saved 170, in particular in an index-searchable database and/or with the information identifying the screenshot cluster.

The method 100 may comprise the following steps:
a) loading 115 of additional data of the user session, e.g. gaze data and/or interaction data, comprising a timing information correlated to the screen recording from a storage medium and
b) attributing 165 the additional data to the screenshot cluster based on the timing information.

The results of the attribution 165 may be saved 170 with the information identifying the screenshot cluster.

The cycling phase CP may be repeatedly performed after differently setting 140 the similarity threshold value.

Figure 5:
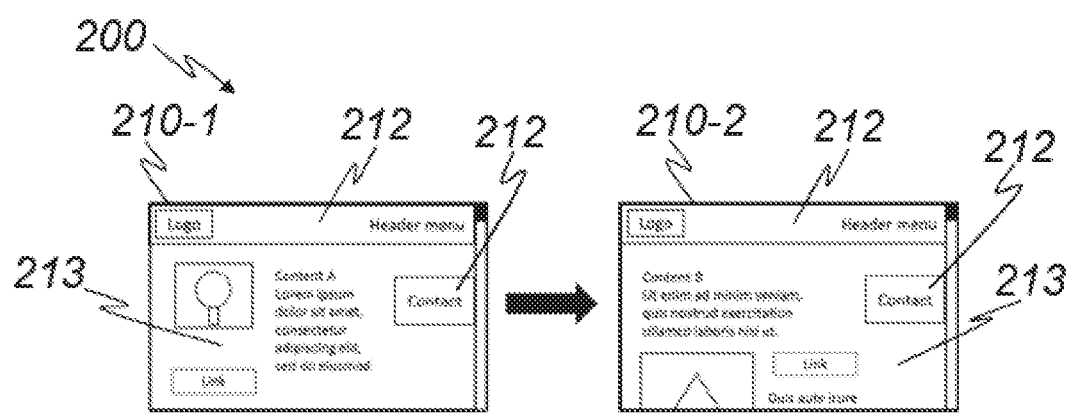
FIG. 5 shows two consecutive screenshots from a screenshot cluster.

FIG. 5 shows two consecutive screenshots 210-1 and 210-2 from a screenshot cluster 220. Each of the screenshots 210-1, 210-2 contains fixed regions 212, e.g. a menu bar and a contact area, and scrollable content 213, e.g. from two different web pages or application windows. Since the scrollable content is different in the two screenshots 210-1, 210-2, there are only few common visual features of the two screenshots 210-1, 210-2 outside the fixed regions 212. Therefore, the two screenshots 210-1, 210-2 are attributed to different screenshot clusters, representing e.g. different web pages or application windows.

Figure 6:
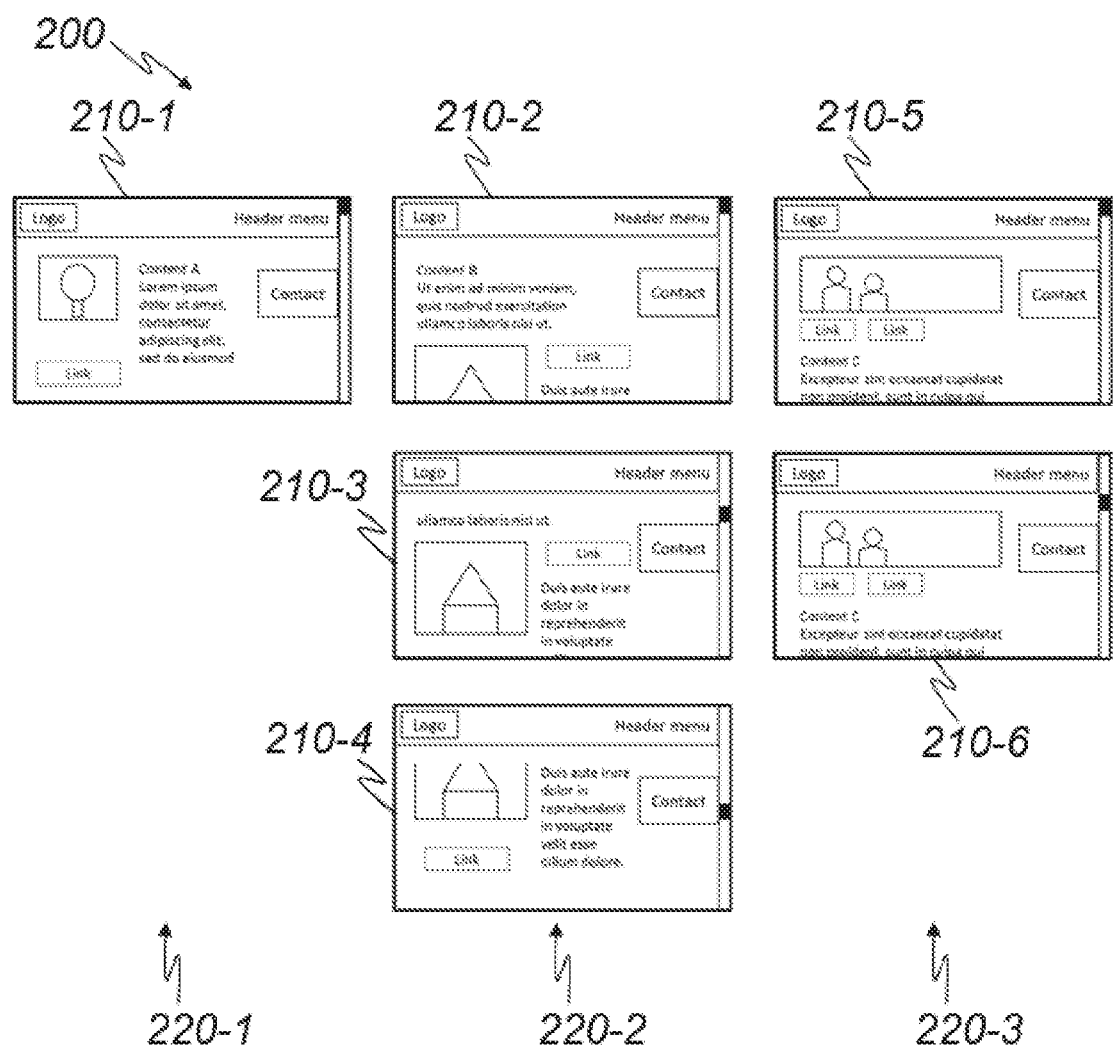
FIG. 6 illustrates the clustering of screenshots of a screen recording.

FIG. 6 illustrates the clustering of six screenshots 210-1 to 210-6 of a screen recording 200 into three screenshot clusters 220-1 to 220-3 represented in the figure by three columns, wherein each screenshot cluster 220-1 to 220-3 shows e.g. an individual web page or application window.

Figure 7:
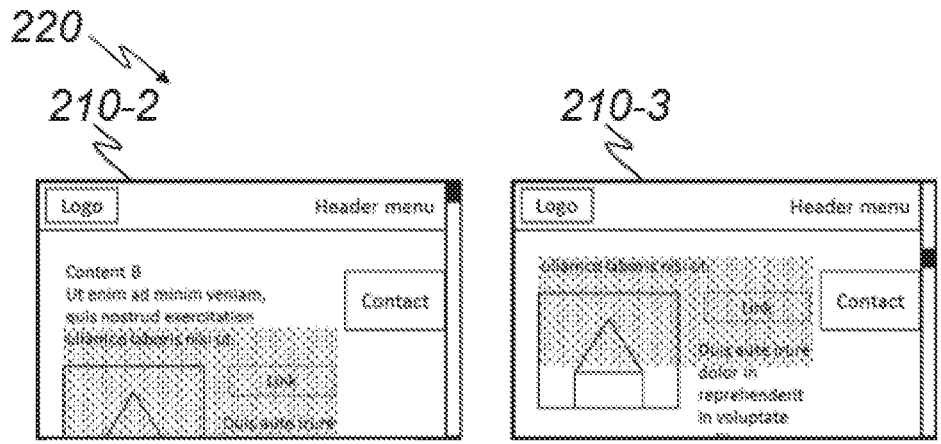
FIG. 7 shows two consecutive screenshots from a screenshot cluster.

FIG. 7 shows two consecutive screenshots 210-2 and 210-3 from a screenshot cluster 220. The hatched area marks an overlapping region of the two screenshots 210 containing common visual features. The hatched area is scrolled upwards in the right screenshot 210-3 compared to the left screenshot 210-2. Therefore, the positions of the common visual features have changed, and these features are classified as scrolled features.

Figure 8:
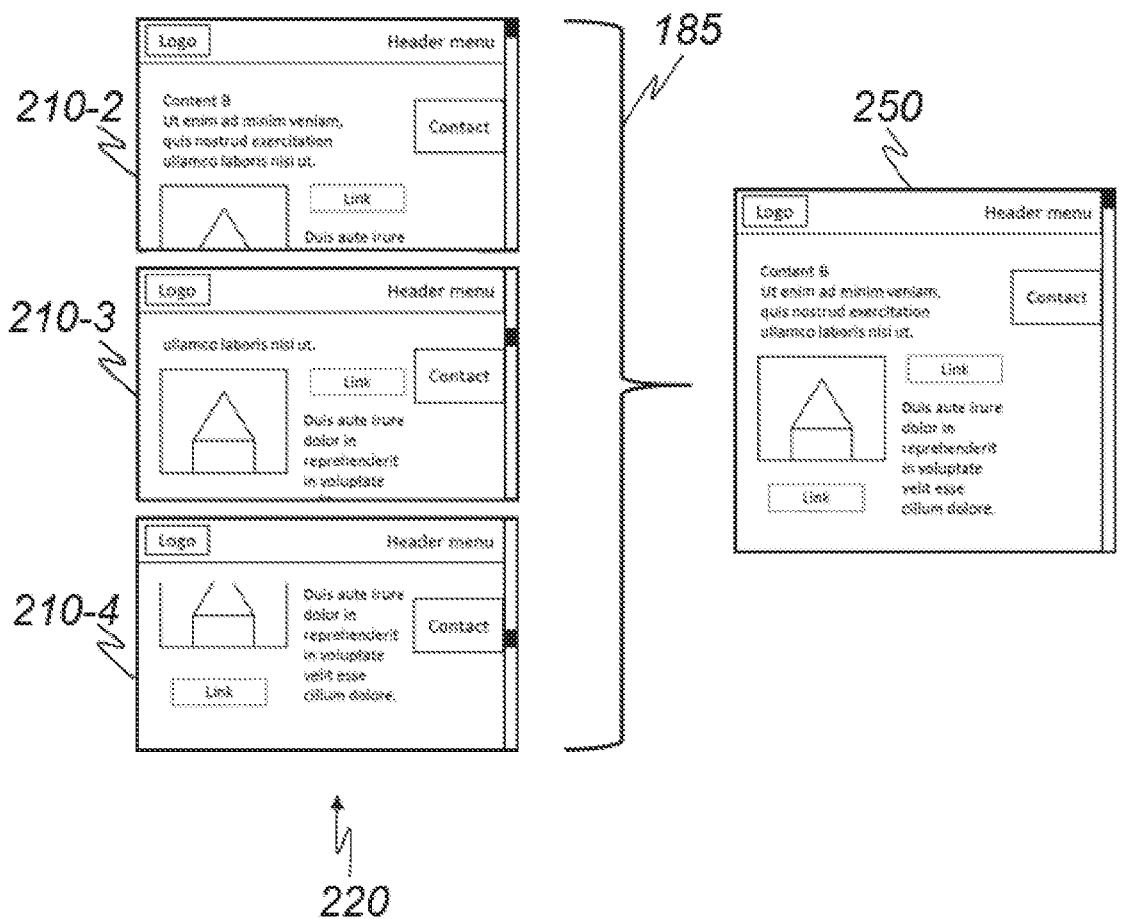
FIG. 8 illustrates the step of stitching of screenshots of a screenshot cluster.

FIG. 8 illustrates the step of stitching 185 of, e.g. three, screenshots 210-2 to 210-4 of a screenshot cluster 220, showing e.g. different views of the same web page or application window obtained by scrolling. By stitching 185 the screenshots 210-2 to 210-4 to one another an extended screenshot 250 is obtained, showing e.g. all regions of the web page or application window that have been viewed by the user.

Figure 9:
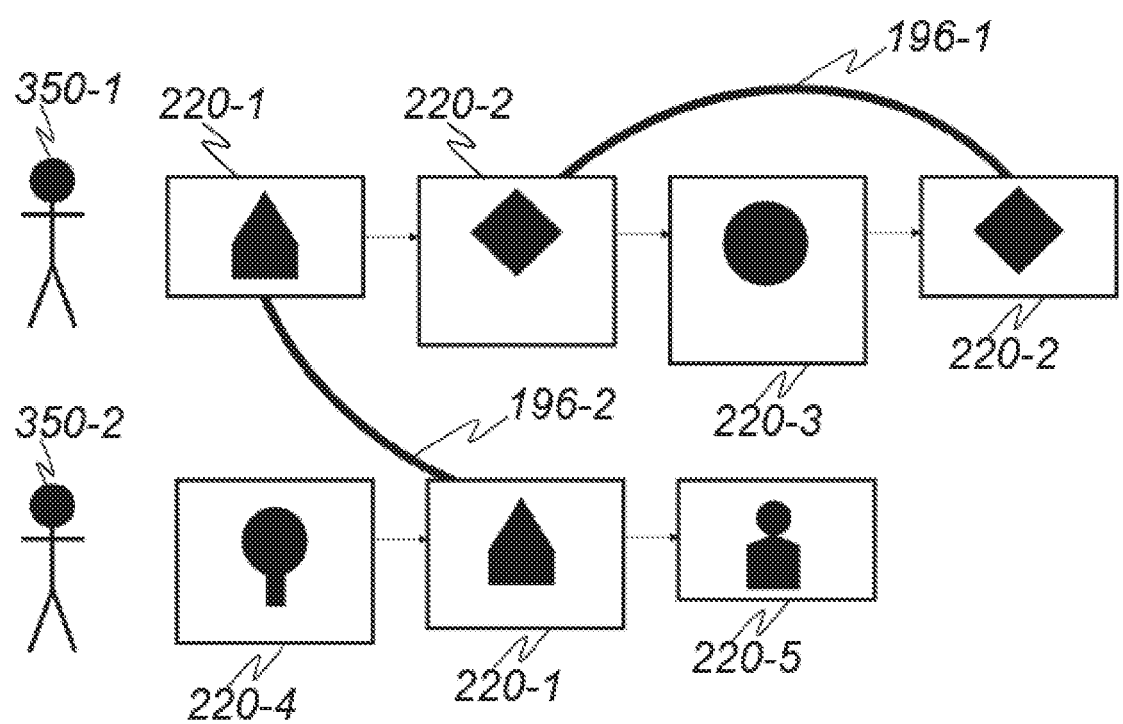
FIG. 9 illustrates the step of aggregation of screenshot clusters.

FIG. 9 illustrates the step of aggregation 196 of screenshot clusters 220. Each of the two sequences of screenshot clusters 220-1 to 220-5 shown in two lines in the figure is obtained from a different screen recording, e.g. from two different users 350-1 and 350-2. Like symbols and reference numbers represent screenshot clusters 220 with similar visual content. By comparing the identification vectors of the screenshot clusters, it is possible to aggregate 196 screenshot clusters 220 from the same screen recording (196-1, within the same line in the figure) or from different screen recordings (196-2, between the two lines in the figure).

Visually similar screenshot clusters may appear for example when a user 350-1 revisits a web page or application window during a screen recording or when two users 350-1, 350-2 independently visit the same web page or application window.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS LIST 100 method
110 loading of a screen recording
115 loading of additional data
120 detecting
124 classifying
125 identifying
126 cutting
130 creating
140 setting
150 calculating a similarity value
160 defining
165 attributing
170 saving
175 reinitialising
180 determining
185 stitching
190 creating
196 aggregating
199 visual content
200 screen recording
210 screenshot 212 fixed region
213 scrollable content
214 scrollbar
220 screenshot cluster
240 additional data
241 gaze data
242 interaction data
250 extended screenshot
300 computing system
310 storage medium
320 processor
330 display device
340 user input device
341 eye tracking device
342 mouse
343 touch device
344 keyboard
350 user
CP cycling phase
IP initial phase

The invention claimed is:

1. A screen recording preparation method for evaluating software usability using additional data of a user session carried out by a computing system, whereas the method comprises an initial phase with the steps
   a) loading a screen recording comprising a number of N time-ordered screenshots of the user session from a storage medium and
   b) detecting visual features within each of the N screenshots, wherein each of the features is attributed a position within the respective screenshot and a score identifying the feature, and
   c) creating a set of metadata containing an identifier of each of the N screenshots and the features detected within each of the N screenshots and
   d) setting a threshold similarity value,
   and the method includes a cycling phase treating the metadata with the steps:
   e) comparing a number of n consecutive screenshots from an $x^{th}$ screenshot of the screen recording onwards for similarity using only the metadata, wherein similar screenshots have a similarity value deviation below the threshold similarity value, wherein the similarity value is based on the number of common features that have the same score within all of the n screenshots, for $n \in \{2, 3, 4, \ldots, N-x+1\}$ as long as the n screenshots are similar and
   f) attributing the n similar screenshots to a screenshot cluster and
   g) saving information defining the screenshot cluster to a storage medium and
   h) reinitialising the cycling phase, wherein x is replaced by x+n, as long as $x+n \in \{2, 3, 4, \ldots, N-1\}$,
   wherein the following steps are performed on the n screenshots of a screenshot cluster:
   i) classifying each of the common features of the n screenshots either as a fixed feature if it has the same position in the n screenshots or as a scrolled feature if it has different positions in the n screenshots;
   and, if fixed features and scrolled features are found during the step of classifying,
   j) identifying regions of the n screenshots containing no scrolled features as fixed regions;
   k) cutting the fixed regions from the n screenshots and storing the fixed regions;
   l) determining sequentially for $y \in \{1, 2, 3, \ldots, n-1\}$ a yth shift vector between the yth screenshot and the (y+1)th screenshot based on a difference in position of the scrolled features between the two screenshots;
   m) stitching the 2nd screenshot to the 1st screenshot to obtain an extended screenshot using the 1st shift vector to determine the relative position of the two screenshots; and
   n) stitching sequentially for $y \in \{2, 3, \ldots, n-1\}$ the (y+1)th screenshot to the extended screenshot using the sum of the 1st to yth shift vectors to determine the relative position of the (y+1)th screenshot with respect to the extended screenshot.

2. The method of claim 1, wherein the step of identifying fixed regions comprises identifying the fixed regions as the regions of the n screenshots outside a convex contour of the positions of the scrolled features.

3. The method of claim 2, wherein the method comprises defining fixed features located at a given distance from a border of a screenshot as outliers if there are more scrolled features than fixed features at this distance from the border, wherein outliers are not considered for the step of identifying fixed regions.

4. The method of claim 1, wherein the method comprises the step of updating a position information of additional data attributed to the $(y+1)^{th}$ screenshot using the sum of the $1^{st}$ to $y^{th}$ shift vectors.

5. The method of claim 1, wherein the method comprises defining the first of the n screenshots as extended screenshot of the screenshot cluster if there are no scrolled features found within the n screenshots during the step of classifying.

6. The method of claim 1, wherein the method comprises the following steps:
   a) creating an identification vector of each of the screenshot clusters of a plurality of screenshot clusters based on the scores and also the positions of the features of the screenshot cluster and
   b) including the identification vector into an index-searchable database.

7. The method of claim 6, wherein the identification vector comprises the frequency of the scores and also of the positions of the features of the screenshot cluster using the term frequency inverse document frequency concept of information retrieval.

8. The method of claim 6, wherein the method further comprises comparing the identification vectors of screenshot clusters from at least one of a single screen recording and a plurality of screen recordings to aggregate similar screenshot clusters having similar identification vectors.

9. The method of claim 8, wherein similarity of the identification vectors is measured by cosine similarity measurement.

10. The method of claim 1, wherein the method comprises the following steps:
    a) loading of additional data of the user session, comprising gaze data and/or interaction data, comprising a timing information correlated to the screen recording from a storage medium and
    b) attributing the additional data to a screenshot cluster or to a screenshot or extended screenshot of the screenshot cluster, based on the timing information and
    c) overlaying a screenshot or an extended screenshot with the additional data attributed to the screenshot or extended screenshot or to the screenshot cluster comprising the screenshot or extended screenshot.

11. The method of claim 1, wherein the setting of the threshold value of the similarity value is done automatically based on the content of the screen recording.

12. A computing system comprising a processor and a storage medium configured to perform the method of claim 1.

13. A non-transitory computer-readable storage medium comprising instructions which, when executed by a computing system, cause the computer system to carry out the method of claim 1.

* * * * *